Aug. 14, 1928.  1,680,714
R. C. WORTHINGTON ET AL
VARIABLE SPEED GEAR
Filed June 9, 1925   2 Sheets-Sheet 1

Inventors:-
Richard C. Worthington
Herbert Milner
by Barthel & Barthel
Attorneys Aug. 14, 1928.

R. C. WORTHINGTON ET AL 1,680,714

VARIABLE SPEED GEAR

Filed June 9, 1925 2 Sheets-Sheet 2

Inventors:—
Richard C. Worthington
Herbert Milner
by Barthel & Barthel
Attorneys.

Patented Aug. 14, 1928.

1,680,714

UNITED STATES PATENT OFFICE.

RICHARD COBDEN WORTHINGTON AND HERBERT MILNER, OF BLACKPOOL, ENGLAND.

VARIABLE-SPEED GEAR.

Application filed June 9, 1925, Serial No. 36,063, and in Great Britain June 19, 1924.

This invention relates to power transmission gearing, being particularly applicable to motor road vehicles and boats and turbine-propelled vessels; and has for its object to provide an improved variable speed gearing of the type which enables the power of the engine to automatically balance the torque effort or load.

The advantages of such a gearing when applied, say, to a motor vehicle are substantial;—there is an economy in the consumption of fuel, as when the torque load becomes lighter, due to the momentum of the vehicle, or the lessening of resistance to its motion, the speed of the engine may be lowered; the periodicity of the engine is reduced, with consequential reduction of wear and tear; and the necessity for gear changing by the driver of the vehicle is obviated, as the gear automatically adjusts itself to the load conditions; this reduction of periodicity and removal of necessity for gear changing enhances the life of the vehicle in use.

Transmission gearing, according to our invention, is simple in construction, (and so may be produced at low manufacturing cost) and efficient in use; it permits of the driving and driven elements, such as shafts, to be arranged in the same straight line; it lends itself to ready adoption in motor vehicles of standard design; and it becomes a solid unit at all times when the engine power equals the load.

Power transmission gearing, according to our invention, essentially comprises a driving and a driven element, preferably arranged in the same straight line, and means interposed between said driving and driven elements whereby, when the power is in excess of or balances the torque effort or load, the "drive" is 'solid", and when the torque effort or load becomes greater than the power a reduced gear effect automatically ensues, so that the rate of rotation of the driving element becomes greater than that of the driven element; and when the power overcomes the torque effort or load the drive automatically returns to "solid."

Means may also be provided whereby further or additional gear change or changes automatically ensue on the continued increasing of the torque effort or load relative to the power, and vice versa.

We will further describe our invention with the air of the accompanying sheet of explanatory drawings which illustrate by way of examples only, two modes of carrying the invention into effect.

In said drawings;—

In the several views like characters of reference denote like or equivalent parts wherever they occur.

Figure 1:
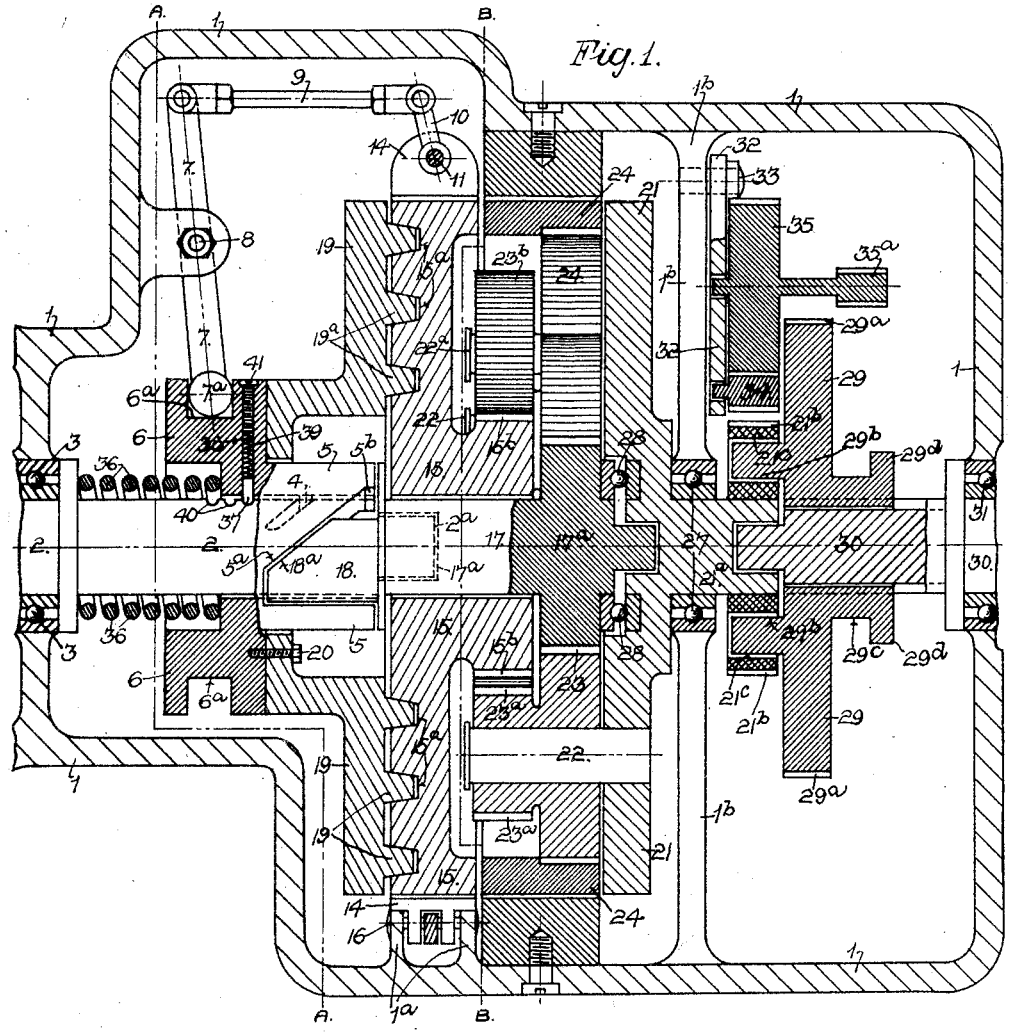
Fig. 1 is a longitudinal section.
Figure 3:
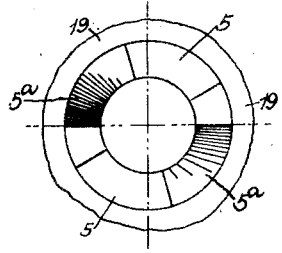
Figs. 3 and 4 are elevations, at right angles to each other, of a clutch element or member.
Figure 4:
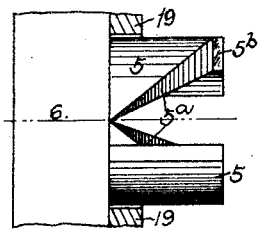
Figure 5:
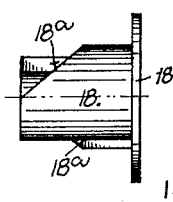
Figs. 5 and 6 are corresponding views of a co-acting clutch element or member.
Figure 6:
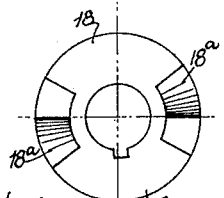

Referring first, more particularly, to the construction illustrated in Figs. 1 to 6, inclusive;—

1 indicates a casing which may be of unit construction with the engine, or bolted or bolted or otherwise secured thereto, 2 is a shaft (the driving element), connected to the engine through the customary or other suitable clutch, said shaft being adapted to rotate in ball bearings 3.

Secured by key 4 to said shaft 2, but being slidable thereon, is a clutch element or member 5 having inclined engaging faces $5^a$ and stops $5^b$, and integral with said clutch member 5 is a collar 6 provided with an annular groove $6^a$ wherein is disposed the spherical end $7^a$ of a link or lever member 7 which is pivoted at 8 to the casing 1; pivotally connected to the outer end of said link 7 is an end of a rod 9 the other end whereof is attached by means of a link 10 to a transverse rod 11 provided with a pair of collars 12 each having a cam projection $12^a$ which is adapted to engage a similar cam projection $13^a$ of a collar 13 secured to a brake shoe 14, the pair of brake shoes being disposed around a circular member or disc 15 and pivotally mounted on a pin 16 carried by lugs $1^a$ formed in the casing 1. Said brake shoes 14 are maintained out of engagement with the circular member or disc 15 by means of springs $11^a$.

Said member 15 is loosely mounted on a shaft 17 one end of said shaft being keyed to a clutch member 18 designed to engage the clutch member 5, and having similar inclined faces $18^a$ which are adapted to co-act with the inclined faces $5^a$ of said clutch member 5.

In order to prevent sidewise or lateral relative displacement of the shafts 2 and 17, a spigot $2^a$ is formed on shaft 2 which spigot projects into a socket or recess as shown, of shaft 17.

Said member 15 is provided with a plurality of annular recesses $15^a$ which are adapted to receive corresponding projections $19^a$, of a member 19 which is fixedly secured to the collar 6 by screws 20. Thus, said collar 6 and member 19 are adapted to revolve as one.

Integral with shaft 17 is a toothed wheel $17^a$.

21 is a disc or plate which carries, by means of the lateral arms 22, three toothed wheels 23 which are in constant mesh with the wheel $17^a$ and also toothed wheels $23^a$ which are integral with the wheels 23, and are in constant mesh or engagement with toothed wheels $23^b$ mounted on arms $22^a$ carried by the disc or plate 21 and which wheels $23^b$ are in constant mesh with a toothed wheel $15^b$ integral with member 15.

Said wheels 23 are in constant mesh with an internally toothed wheel 24 which is free to rotate in one direction only being prevented from rotating in the other direction by means of rollers 25 disposed in recesses 26 in wheel 24 and spring plungers $25^a$.

Plate 21 is supported in ball bearings 27 carried by the arms or webs $1^b$ of the casing; said member 21 also carries ball bearings 28 for supporting the adjacent end of shaft 17. The outer end of said plate 21 is provided with a dog clutch member $21^a$ having spur teeth $21^b$ on its periphery. Adapted to engage with said clutch member $21^a$ is a clutch member 29 provided with spur teeth $29^a$ on its periphery. Projections $29^b$ of said clutch member 29 are adapted to engage the passages $21^c$ of the clutch member $21^a$.

Said clutch member 29 is splined to and slidable on a shaft 30 (the driven element) and is operated by means of a fork, or the like, which engages in an annular recess $29^c$ of the clutch collar $29^d$.

Said shaft 30 is supported by ball bearings 31 carried by the casing 1 and leads, through the customary universal joint, to the road wheels of the vehicle.

Mounted on bell crank lever 32 pivoted at 33 to the web $1^b$ of the casing are toothed wheels 34, 35, and $35^a$, wheels 34 and 35 being in constant mesh.

A helically coiled spring 36 is disposed around said shaft 2 and tends to maintain slidable clutch element 5 in complete engagement with the clutch element 18 on shaft 17.

Figure 2:
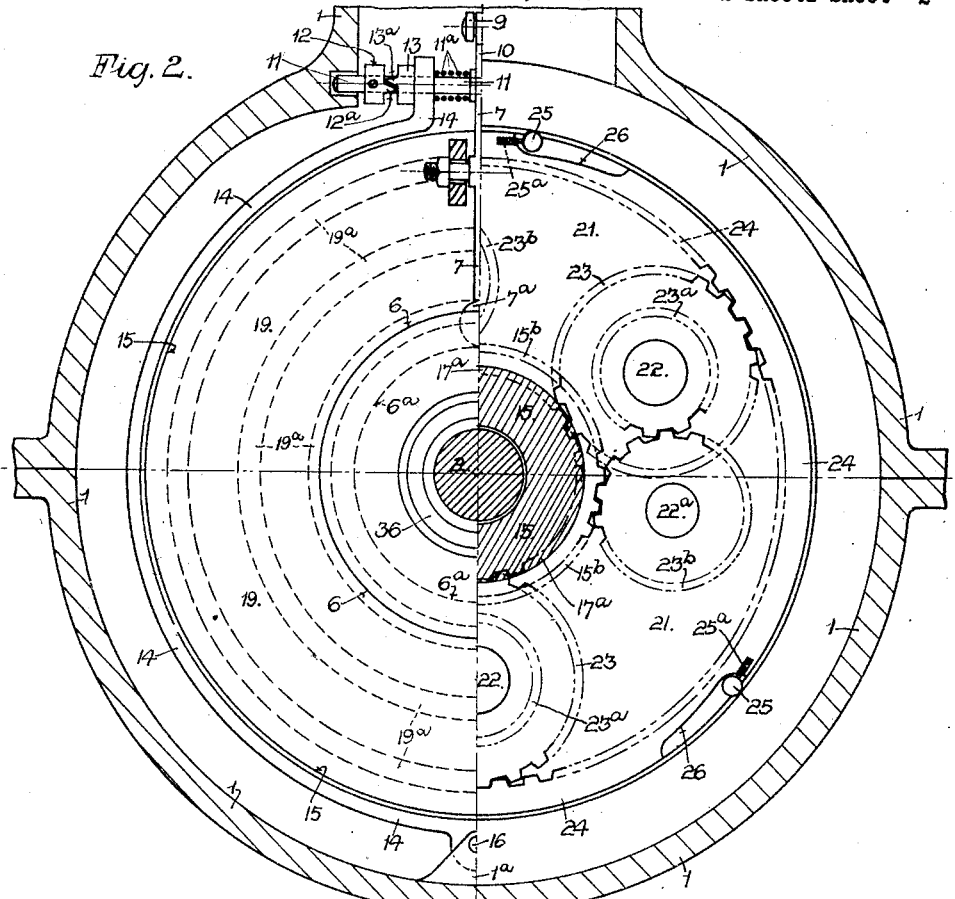
Fig. 2 is a transverse section, taken as on lines A—A and B—B, Fig. 1, of motor vehicle gearing having three speeds forward, neutral and reverse.

When the parts are in the positions shown in Figs. 1 and 2, the clutch members 5 and 18 are in full engagement; consequently shaft 2 is solid with shaft 30, via collar 6, member 10, member 15, toothed wheels $15^b$ and $17^a$, toothed wheels 23, $23^a$ and $23^b$, internally toothed ring 24, plate 21, and dog clutch members $21^a$, 29; all revolving solidly together.

When the load becomes too great for the power of the engine, said clutch element 5 moves against the resistance spring 36, with the result that the annular projections $19^a$ of member 19 withdraw from their corresponding recess $15^a$ of member 15. The collar 6 in its movement also moves the link or lever 7 about its axis 8; consequently the brake shoes 14, through the engagement of projection $12^a$ of collar 12 with the projection $13^a$ of collar 13, are moved inwardly and lock the member 15. The vehicle is thus brought automatically to second gear, the drive being now taken through shaft 2, clutch members 5 and 18, shaft 17, toothed wheel $17^a$, toothed wheels 23, and toothed wheels $23^a$ and $23^b$ which latter wheels rotate about the now stationary, toothed wheel $15^b$, and rotate plate 21. The drive from said plate to the shaft 30 is the same as for top gear.

On further outward movement of the collar 6 and clutch member 5 against the resistance of spring 36 (the stop portions $5^b$ prevent complete disengagement of the clutch members 5, 18) the brake shoes 14 release member 15 which is now free to rotate, the projection $12^a$ of collar 12 is disengaged from the projection $13^a$ of collar 13 and the vehicle is now on bottom gear, the drive being taken through shaft 2, clutch members 5 and 18, toothed wheel $17^a$, and toothed wheels 23 which roll around the, now stationary, internally toothed ring 24 and rotate plate 21.

As the engine overcomes the load, the gear automatically returns from the bottom gear to second, and thence to top.

To put the gearing in neutral position, clutch member 29 is withdrawn from clutch member $21^a$. When it is desired to reverse, the bell crank 32, through the actuation of the reverse lever, is operated so that the toothed wheel 34 meshes with the teeth $21^b$ of clutch member $21^a$, and toothed wheel $35^a$ meshes with the teeth $29^a$ of clutch member 29 which drives the shaft 30.

A stop 37 disposed in a passage 38 formed in the collar 6, and having a spring 39 pressing on the same, is adapted to project into grooves 40 formed in shaft 2; said grooves determine the correct position for the collar 6 at different speeds. The compression of the spring 39 on top 37 may be adjusted by means of the screwed stud 41.

In considering the foregoing it will be noted that certain toothed wheels constitute a planetary gear system of which the gear $15^b$, is the inner gear and gear 24 a ring gear rotatable in one direction only.

Figure 7:
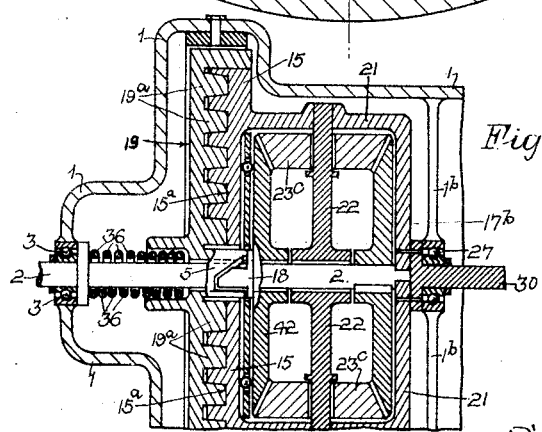
Fig. 7 illustrates, in section, a modified construction.

The construction illustrated in Fig. 7 is similar to that before described, except that toothed bevel gearing is substituted for spur gearing.

23ᶜ are toothed bevel wheels mounted on spindles 22, carried by a plate 21 which is integral with the circular member or disc 15. Said bevel wheels 23ᶜ mesh with a bevel wheel 42 loosely mounted on shaft 2, and with bevel wheel 17ᵇ keyed to shaft 2.

When the parts are in the positions shown in the drawings the drive is "solid" and the clutch member 19—which is slidable on the shaft 2—is in engagement with the disc 15 and rotates plate 21 and shaft 30 secured to said plate.

When the load becomes too great for the power of the engine, clutch element 5 moves against resistance of spring 36 as in the previous construction, clutch 19 disengages from the circular member 15, and the vehicle is now on second gear, the drive being taken through shaft 2, bevel wheel 17ᵇ, and bevel wheels 23ᶜ which rotate about the—now stationary—bevel wheel 42, the latter being prevented from rotating in a reverse direction by such means as the rollers 25 disposed in recesses 26 of clutch 19 in Figure 2.

By duplicating or suitably modifying the mechanism, or parts thereof, further speed reduction or reductions may be effected.

Whilst the invention has been described mainly in relation to its preferred form, it will be obvious that modifications may be made without departing from its spirit and scope as defined by the claims.

What we claim as our invention and desire to secure by Letters Patent is:—

1. Power transmission gearing, comprising a driving shaft provided with a slidable clutch member; a second clutch member provided with a toothed wheel; a disc revolubly disposed around said second clutch member, an with which said first mentioned clutch member is adapted to engage; a toothed wheel formed on said disc; a plate to which a driven shaft is connected; toothed wheels carried by said plate, in mesh with the wheel of said second clutch member; other toothed wheels carried by said plate in mesh with the wheel of said disc, and a one-way internally toothed wheel in mesh with the first-mentioned toothed wheels carried by said plate; means whereby said slidable clutch member may engage said disc under spring influence which also tends to maintain said clutch members in engagement; a brake disposed around said disc and so connected with said slidable clutch member that when the clutch members are in full engagement the "drive" is "solid" said slidable clutch member being in engagement with the disc which is free to rotate, and when the torque effort or load becomes greater than the power, disengagement or partial disengagement of the clutch members ensue, and the consequential movement of said sliding clutch member causes its withdrawal from said disc, and causes the braking thereof to effect gear reduction; and on the continued increasing of the torque effort or load relative to the power, said disc is unbraked and a further gear reduction takes place; and when the power overcomes the torque effort or load the "drive" automatically returns to second gear and thence to "solid".

2. A variable speed gear comprising driving and driven aligning shafts, a yieldable clutch between said shafts, a two-part disk clutch adapted to be driven by said driving shaft, a brake, means connecting a part of said disk clutch and a part of said yieldable clutch so that when said clutches yield said brake is applied to a part of said disk clutch, and a planetary gear system having an inner gear carried by the connected part of said disk clutch and a ring gear rotatable in one direction only, a part of said planetary gear system being carried by said driven shaft.

3. A variable speed gear, as called for in claim 2, wherein the brake surrounds a part of the disc clutch and includes opposed brake shoes, a cam action operable by the connection between the yieldable and disc clutches, and an operative connection between said cam action and said shoes.

4. A variable speed gear as called for in claim 2, and a yieldable detent associated with said yieldable clutch for the purpose of defining conditions of said variable speed gear.

5. In a variable speed gear, driving and driven shafts, a planetary gear system supported by the driven shaft and including a one-way rotatable ring gear, intermediate gears and an inner gear, disc clutch members with one of said members supporting an inner gear of the planetary gear system, a brake for the disc clutch member carrying the inner gear, a yieldable clutch on the driving shaft adapted to actuate the other disk clutch member, and a connection between said brake and said yieldable clutch by which said yieldable clutch may control said brake.

In testimony whereof we affix our signatures.

RICHARD COBDEN WORTHINGTON.
HERBERT MILNER.